United States Patent [19]
Bölling et al.

[11] Patent Number: 4,858,962
[45] Date of Patent: Aug. 22, 1989

[54] ARTICULATED JOINT

[75] Inventors: Fritz C. Bölling, Witzenhausen; Josef Sellner, Espenau, both of Fed. Rep. of Germany

[73] Assignee: Thyssen Industrie AG, Fed. Rep. of Germany

[21] Appl. No.: 25,228

[22] Filed: Mar. 12, 1987

[30] Foreign Application Priority Data

Mar. 15, 1986 [DE] Fed. Rep. of Germany ....... 3608782

[51] Int. Cl.$^4$ .................. F16L 27/06; F16C 11/06
[52] U.S. Cl. .................... 285/136; 285/190; 285/264; 403/39; 403/113; 403/131
[58] Field of Search ............. 285/272, 275, 131, 264, 285/265, 135, 136, 190, 282; 384/213, 375, 377, 372; 403/15, 31, 34, 35, 37, 38, 39, 150, 115, 113, 112, 57, 131

[56] References Cited
U.S. PATENT DOCUMENTS

| | | | |
|---|---|---|---|
| 1,821,174 | 9/1931 | Bowman et al. | 403/39 |
| 2,088,321 | 7/1937 | Follet | 403/113 X |
| 2,266,383 | 12/1941 | Quintrell | 285/264 X |
| 2,417,491 | 3/1947 | Hill | 285/136 |
| 2,434,629 | 1/1948 | Taylor | 285/136 |
| 2,521,731 | 9/1950 | Kennedy | 384/213 |
| 2,659,615 | 11/1953 | McClain | 285/136 |
| 2,710,598 | 6/1955 | Baas | 285/136 X |
| 2,772,897 | 12/1956 | Shaw et al. | 285/190 |
| 2,823,085 | 2/1958 | Keylwert | 403/39 |
| 3,019,646 | 2/1962 | Gavin | 285/131 X |
| 3,243,212 | 3/1966 | May | 285/190 X |
| 3,379,464 | 4/1968 | Bradshaw | 403/39 |
| 3,678,810 | 7/1972 | Holmes et al. | 285/135 X |
| 3,778,174 | 12/1973 | Molby | 403/365 X |
| 3,957,291 | 5/1976 | Edling et al. | 285/136 |
| 4,177,564 | 12/1979 | Flatland | 285/265 X |
| 4,378,123 | 3/1983 | Largent et al. | 285/131 X |
| 4,422,676 | 12/1983 | Sitabkhan | 285/136 |

FOREIGN PATENT DOCUMENTS 1034431 7/1958 Fed. Rep. of Germany .
1869890 4/1963 Fed. Rep. of Germany .
2235172 7/1972 Fed. Rep. of Germany .
2005524 12/1969 France .

Primary Examiner—Peter M. Cuomo

[57] ABSTRACT

The invention relates to an articulated joint for the articulating connection of two joint bodies, having a first bearing body disposed in a bore of one of the joint bodies for rotation therewith and provided internally with a first spherical bearing surface, having a second bearing body joined with the other joint body for rotation therewith and having a second spherical outer bearing surface in contact with the first bearing surface, and having at least two fluid pathways leading through the two joint bodies and the bearing bodies for at least one fluid and having gaskets for sealing off the fluid pathways. Each fluid pathway has a recess formed in the bearing surface of the bearing body, and a passage being associated to one of the recesses and formed in the bearing surface of the other bearing body. Furthermore, stops are provided for establishing a permissible articulating range of both of the joint bodies such that each passage will open into the associated one of these recesses in all possible articulated positions of the joint bodies within this range.

8 Claims, 2 Drawing Sheets

ARTICULATED JOINT

BACKGROUND OF THE INVENTION

The invention relates to an articulated joint for the articulatingly joining of two joint bodies, having a first bearing body disposed in a bore of one of the joint bodies for co-rotation therewith and provided internally with a first spherical bearing surface, having a second bearing body which is joined to the other joint body for co-rotation therewith and has a second, spherical, outer bearing surface in contact with the first bearing surface, having a first fluid pathway leading through the two joint bodies and the bearing bodies for a fluid, and having gaskets to seal the fluid pathway.

In machinery elements which are connected in an articulated manner to one another, it is often desired to provide a pathway through the joint to carry a fluid, for example for the purpose of avoiding the use of systems of tubing or hoses for transferring the fluid or of protecting the fluid pathway against external damage. This is especially true in cases in which a component mounted on a support or a machine part connected therewith is to be driven by hydraulic or pneumatic cylinder-and-piston units which cannot be fastened directly or rigidly to the support.

In known articulated joints of the kind specified above (DE-OS No. 22 35 172, DE-GM No. 18 69 890) only a single pathway through the joint is provided for a fluid. It is a disadvantage that the fluid can be transported through the pathway in only one direction and only at a rate of flow dependent upon the cross section of the pathway. On account of the special construction of the known joints, it is also not easily possible to create at least one additional fluid pathway that will be independent of the one available, without thereby mechanically weakening the bearing parts or undertaking complex separate arrangements for the production of the various special components.

The invention is therefore addressed to the problem of designing the articulated joint with simple components such that at least two fluid pathways independent of one another will lead through the joint, which can run in the same direction so as to carry larger flows of fluids, or in opposite directions to carry fluids in opposite directions.

SUMMARY OF THE INVENTION

For the solution of this problem, the invention is characterized in that at least a second fluid pathway independent of the first fluid pathway is provided, leading through the two joint bodies and the bearing bodies, plus additional gasketing to seal off the second fluid pathway, in that each fluid pathway has a recess formed in the bearing surface of one of the bearing bodies, and a passage formed in the bearing surface of the other bearing body, and in that stop means are provided for establishing a permissible articulating range of the two joint bodies such that each passage will lead into an associated one of these recesses in all possible articulating positions of the joint bodies within this range.

The invention offers the advantage that, in spite of using largely available or cheaply manufactured components, it creates an articulated joint having at least two fluid pathways independent of one another, through which two identical or different fluids can flow in the same or in opposite directions. The magnitude of the possible articulating movements of the two joint bodies, however, depends on the number and size of the recesses. The stop means assure that the fluid pathways that are provided will form passages which are open all the way through but sealed against escape of the fluid, in all permissible articulating positions of the two joint bodies.

BRIEF DESCRIPTION OF THE DRAWING

The invention will now be further explained with the aid of a preferred embodiment, in conjunction with the appended drawing, wherein.

DETAILED DESCRIPTION OF A PREFERRED EMBODIMENT

Figure 2:
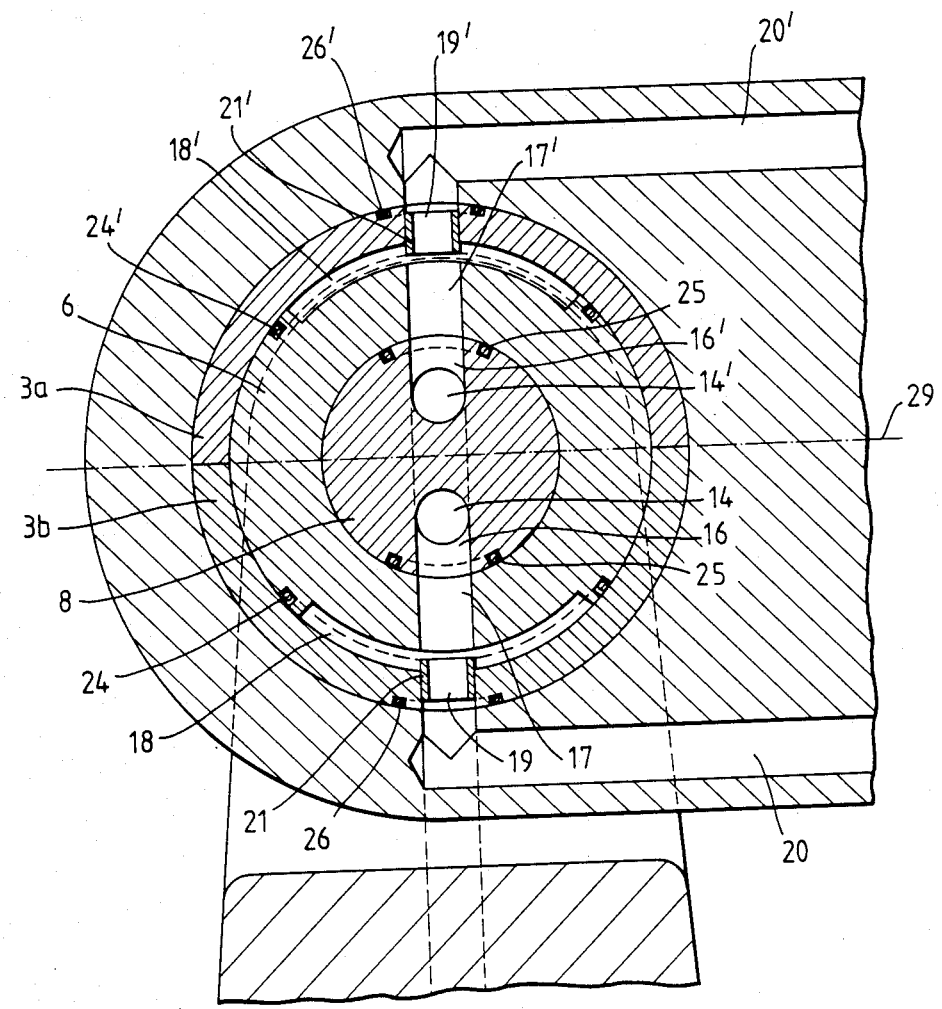
FIG. 2 shows a section along line A-B of FIG. 1.

The articulted joint consists substantially of a first joint body 1 and a second joint body which is designated as a whole by the reference number 5. The first joint body 1 has a cylindrical bore 2 in which a first joint body 3, in the form of a ring, is fixedly disposed. The joint body 3 has a cylindrical outer circumference and a first spherical inner bearing surface 4, and is divided in a plane parallel to its axis into two parts 3a and 3b of substantially equal size (FIG. 2). The joint body 1 is, for example, a pneumatic or hydraulic cylinder which has on the right side in FIG. 2 a chamber, which is not shown, and which is filled with a fluid, and in which a piston joined to a piston rod is movably guided.

The second joint body 5 consists perferably of a fork 7 which has two arms 10 and 10' having cylindrical bores in which a cylindrical pin is contained. On the portion of the pin 8 which is situated betwee the two arms 10 and 10' there is drawn a second body 6 in the form of a ring having a cylindrical internal surface, which has an external bearing surface 6a of spherical shape in contact with the bearing surface 4 of the first joint body 3. The pin 8 is joined by complementary antirotational means to the bearing body 6 and arms 10 and 10' for rotation therewith, and for this purpose can be provided with a slot-and-key joint 9 common to all three parts. The co-rotational joining of these parts can also be achieved by other means, or by providing the pin 8 and the inner surface of the bearing body 6 with other than cylindrical cross sections.

In the articulated joint being described, one of the two joint bodies is mounted for articulating relative to the other, fixedly disposed joint body, or the two joint bodies are disposed for articulating relative to one another, for example by connecting the fork 7 to a vehicle and the joint body 1 to a part of its end which is not seen in FIG. 2, which is articulatingly carried by the vehicle. The relative articulating movements of the two joint bodies can be performed for example about the axis of the pin 8, about an axis lying in the line of section A-B (FIG. 1), and about an axis disposed perpendicularly to both axes, in which case the joint has three degrees of liberty.

For a fluid to be able to flow through this articulated joint, two independent fluid pathways are provided, which are composed of passages disposed in tandem which are of substantially the same configuration for both fluid pathways.

Figure 1:
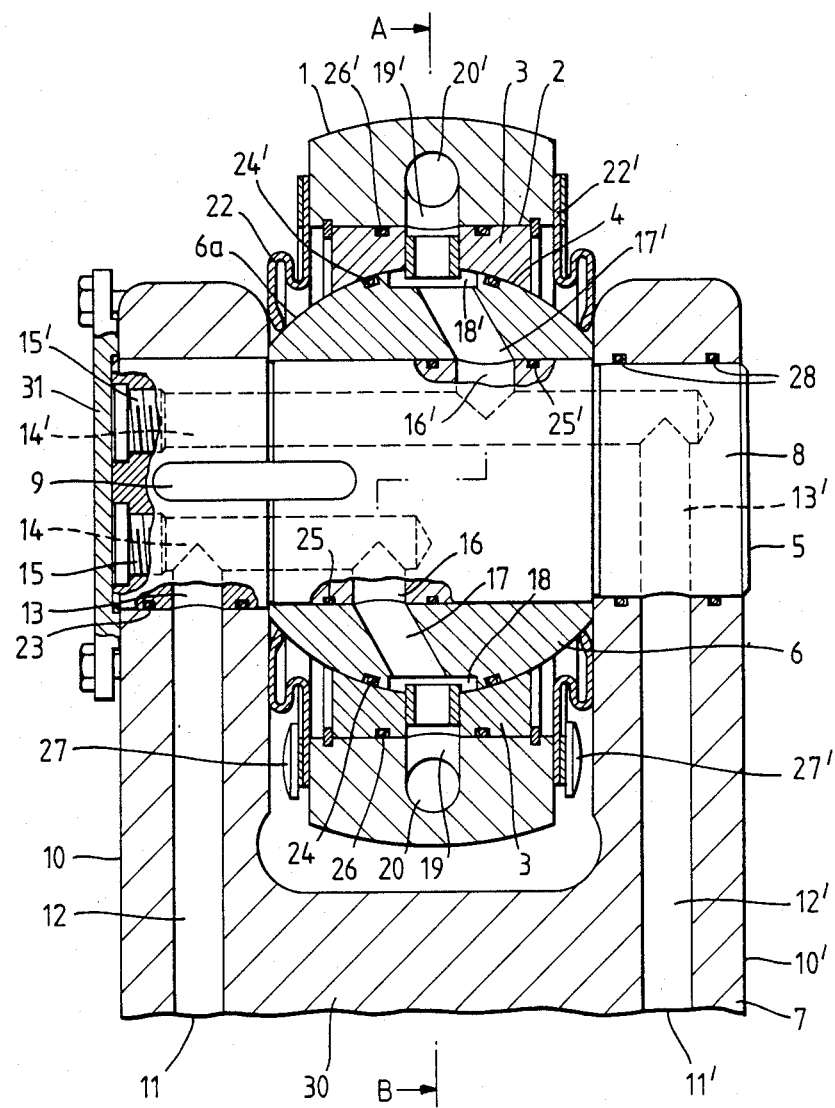
FIG. 1 represents an articulated partially in cross section and partially cut away.

In each arm 10 and 10' of the joint body 5 there is provided a straight passage 12, 12', running lengthwise, which begins at an associated inlet or outlet opening 11, 11', and ends at the associated bore for accommodating the pin 8. In the prolongation of each passage 12, 12', there is provided a passage 13, 13' which is formed in the pin 8 and which merges with a passage 14 and 14', respectively, which is parallel to the pin axis. The passages 14, 14', consist of blind holes which are closed off from the outside by a plug 15, 15', secured by a cap 31 and communicating each with an additional passage 16, 16' in the pin 8, which terminates at the circumferential surface of the pin 8 and there merges with an additional passage 17 and 17' through the bearing body 6. The other ends of these passges 17 and 17' open into a recess 18 and 18', respectively, which is created in the bearing surface 6a of the bearing body 6. The longitudinal axis of the two passages 17 and 17' can be disposed radially to the pin axis or, as shown in FIG. 1, at an angle thereto, depending on the requirements specified for the mechanical stability of the joint. The two recesses 18 and 18' run preferably on both sides of the equatorial plane of the bearing body 6, which in FIG. 1 is formed by the plane running perpendicular to the plane of the drawing and containing the section line A-B.

Each recess 18, 18', is joined by an additional passage 19, 19', which runs through the bearing body 3 to the joint body 1 and there leads into an additional passage 20 and 20', respectively, as seen especially in FIG. 2.

The two independent fluid pathways which are formed by the passages 12 to 14 and 16 to 20, and 12' to 14' and 16' to 20', respectively, serve to carry a fluid between the terminal ends 11, 11', and the terminal ends, not shown in FIG. 2, of the passages 20 and 20'. If the joint body 1 is in the form of a cylinder, for example these passages can lead on each side of the corresponding piston into the chamber containing the fluid, in order to bring fluid in or carry it out, according to the application.

The recesses 18, 18', formed in the bearing body 6 in this embodiment can alernatively also be created in the bearing surface 4 of the bearing body 3, and in this case can run on both sides of the equatorial plane of the bearing body 3. Furthermore, in both embodiments, the one recess 18 is disposed on one side and the other recess 18' on the other side of a meridian plane of the bearing body 6 and 3, respectively, which in FIG. 2 is perpendicular to the plane of drawing and contains a line 29 running perpendicular to the pin axis.

The parts of the articulted joint which are in contact with one another are provided with gaskets 23, 24, 24', 25, 25', 26, 26' and 28 adjacent the passages and the recesses. The gaskets 23, 25, 25', 26 and 26' are preferably in the form of O-rings disposed concentrically around the passages 12, 12', 13, 13', 16, 16', 17, 17' and 19 and 19', and inserted into coresponding grooves created in the pin 8 and in the cylindrical outer surface of the bearing body 3, while the gaskets 24, 24', sealing off the recesses 18, 18', consist preferably of O-rings or shaped rings which are inserted in grooves surrounding the recesses 18, 18' and are created in the bearing surface 6a of the bearing body 6. The gaskets 28 consist best of O-rings disposed radially to the pin axis, which are inserted into matching grooves in the receiving bores in the arms 10, 10'.

The permissible articulating movements of the two joint bodies 1 and 5 with respect to one another are limited essentially by the dimensins of the recesses 18 and 18' and the passages 19 and 19' of smaller cross section, because the fluids transported through the articulated joint can flow only when the recesses 18, 18', and passages 19, 19', are in communication with one another. To limit the articulating movements, it is desirable to provide nipples 21, 21', which are inserted into the passages 19, 19', project into the recesses 18, 18', and thereby act as stops which at the ends of the permissible articulating movements abut against the walls of the recesses 18, 18', and thereby establish the allowable swiveling range of the joint. Within this range the passages 19, 19', always lead into the associated recesses 18 and 18', respectively, so that the fluid pathways in any articulating position will be completely functional. Alternatively the possible articulating movements are limited by means of externally situated abutments 27, 27' (FIG. 1) which are placed on the sides of the joint body 1 and cooperate with the arms 10, 10'. Lastly, it would be possible to limit the rotary movement around the pin axis simply by the abutment of the joint body 1 against a transverse portion 30 of the joint body 7 at the ends of its range.

To prevent the penetration of dirt and dust, and at the same time prevent the loss of lubricant, the articulated joint preferably has bellows 22 and 22', one on each side of the joint body 1, resting against the spherical bearing surface 6a of the bearing body 6.

The invention is not limited to the described embodiment, which can be modified in many ways within the scope of the invention. This is true especially of the shape and location of the passages and gaskets. Moreover, other stop means can be provided instead of the stops 21, 21', 27 and 27'.

Lastly, the invention is not limited to the use of only two fluid pathways, since three and more fluid pathways and as many passages and recesses can be provided, whose number and size in a joint of given size depends essentially only on the magnitude of the allowable articulating movements. At the same time, of course, provision can be made for using two or more fluid pathways for carrying different fluids for different purposes, or to provide an articulated joint with other degrees of freedom than those described above, with fluid pathways independent of one another.

We claim:

1. Articulated joint for the joining of a first and a second joint body (1,5) comprising:

a first bearing body (3) fixedly disposed in a bore of the first joint body (1), said first bearing body being provided internally with a first spherical bearing surface (4), and having an axis and being divided into segments along a plane parallel to said axis; a second bearing body (6) fixedly disposed on a pin (8), said pin having an axis and being fixed to the second joint body (5), said second bearing body having a second, spherical, outer bearing surface, (6a) in contact with the first bearing surface, said bearing surfaces permitting relative motion between said first and second joint bodies about three axes of rotation, namely a first axis which is the axis of said pin, a second axis perpendicular to the first axis, and a third axis perpendicular to both said first and said second axis: first and second fluid pathways (12-14, 16-20 and 12'-14', 16'-20') independent of each other, each fluid pathway leading from a respective channel (20, 20') in the first joint body (1) through the bearing bodies and through the pin to a respective channel in the second joint body (5) for transporting at least one fluid through the joint and the joint bodies, and each fluid pathway having a first passage (17, 17') formed in one (6) of said first and second bearing bodies and having a first end opening into a pocket-like recess (18, 18') also formed in said one bearing body and bounding its bearing surface, and a second passage (19, 19') formed in the other (3) of said first and second bearing bodies and having a first end bounding the bearing surface of said other bearing body, said first end of said second passage having a smaller cross-section than said pocket-like recess, sealing means (23-26, 24'-26', 28) for sealing said fluid pathways, said sealing means containing each a gasket means (24, 24') surrounding an associated recess (18, 18'), said gasket means being inserted into a groove which is formed in one of said bearing surfaces; and stop means for establishing a permissible range of motion between the two joint bodies about said three axes of rotation such that said first end of each second passage opens into its associated recess in all possible positions of the joint bodies within said permissible range of motion between the two joint bodies.

2. Articulated joint according to claim 1, characterized in that said second joint body (5) comprises a fork (7) having two arms (10,10'), in which said pin (8) is contained, and that said second bearing body (6) is fixed on a portion of the pin situated between the two arms (10,10').

3. Articulated joint according to claim 2, characterized in that said recess (18,18') extends on both sides of an equitorial plane of the spherical bearing surface which it bounds.

4. Articulated joint according to claim 2, characterized in that the recess (18) of said first fluid pathway is disposed on one side and the recess (18') of said second fluid pathway is disposed on the other side of a meridian plane of the spherical bearing surface which it bounds.

5. Articulated joint according to claim 3 or 4, characterized in that two recesses (18,18') are formed in said second bearing body (6), one recess being disposed on one side and the other recess being disposed on the other side of a meridian plane of the second bearing surface, and that two passages (19,19') are formed in said first bearing body, each passage opening into a respective one of said recesses.

6. Articulated joint according to claim 2, characterized in that said first passage (17,17') is disposed radial to said axis of said pin.

7. Articulated joint according to claim 2, characterized in that said first passage (17,17') is disposed at an angle to said axis of said pin.

8. Articulated joint according to claim 1, characterized in that said stop means comprises a nipple (21,21') disposed in said second passage (19,19') and projecting into the associated recess (18,18').

* * * * *